(12) United States Patent
Lindemann et al.

(10) Patent No.: US 10,099,569 B2
(45) Date of Patent: Oct. 16, 2018

(54) ADAPTIVE SYSTEM AND METHOD FOR OPTIMIZING A FLEET OF PLUG-IN VEHICLES

(71) Applicant: GM GLOBAL TECHNOLOGY OPERATIONS LLC, Detroit, MI (US)

(72) Inventors: Todd P. Lindemann, Howell, MI (US); Danielle A. Cory, Brighton, MI (US); Rachel A. White, Lansing, MI (US); Vukasin Denic, Ann Arbor, MI (US); Nicholas J. Kalweit, Novi, MI (US); Eric F. Gorski, Birmingham, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 71 days.

(21) Appl. No.: 15/279,571

(22) Filed: Sep. 29, 2016

(65) Prior Publication Data

US 2018/0086223 A1  Mar. 29, 2018

(51) Int. Cl.
*B60L 11/18* (2006.01)
*G06Q 10/06* (2012.01)
(Continued)

(52) U.S. Cl.
CPC ....... *B60L 11/1862* (2013.01); *B60L 11/1864* (2013.01); *G01C 21/3469* (2013.01);
(Continued)

(58) Field of Classification Search
CPC .. G05D 1/0027; G05D 1/0088; G05D 1/0291; Y02T 10/7088; Y02T 90/163; B60L 11/1838; B60L 11/1861; B60L 11/1862; B60L 2240/72; G06Q 10/0631; G01R 31/3675; G01R 31/3679
See application file for complete search history.

(56) References Cited

U.S. PATENT DOCUMENTS 6,625,539 B1   9/2003  Kittell et al.
6,850,898 B1 *  2/2005  Murakami .......... B60L 11/1816
                                                       340/932.2
(Continued)

FOREIGN PATENT DOCUMENTS

EP   2767431 A1 *  8/2014
JP   2014032459 A *  2/2014

OTHER PUBLICATIONS

EPO machine translation of JP 2014-32459 (original JP document published Feb. 20, 2014) (Year: 2014).*

*Primary Examiner* — Behrang Badii
*Assistant Examiner* — David A Testardi (57) ABSTRACT

A system and method for optimizing a plug-in vehicle fleet having a plurality of battery packs across the vehicle fleet. Each vehicle includes a battery pack. The system includes sensors for measuring battery performance data and includes an open-circuit voltage, charging current, and/or temperature of the battery pack, a GPS receiver, a user interface, and a controller. The controller executes a method to monitor degradation of each battery pack using a variety of current and historical data points. The controller then controls a charging operation of each battery pack in a fleet via a charging control signal sent to a particular vehicle in the fleet. The controller also then determines the new location for each particular vehicle in a fleet.

14 Claims, 3 Drawing Sheets

(51) Int. Cl.
  *G05D 1/00* (2006.01)
  *G01C 21/34* (2006.01)

(52) U.S. Cl.
  CPC ....... *G05D 1/0027* (2013.01); *G06Q 10/0631* (2013.01); *B60L 2240/72* (2013.01); *Y02T 90/163* (2013.01)

(56) References Cited

U.S. PATENT DOCUMENTS

| | | | |
|---|---|---|---|
| 6,941,197 B1* | 9/2005 | Murakami | B60L 11/1816 320/109 |
| 9,056,556 B1* | 6/2015 | Hyde | B60L 11/1851 |
| 9,079,505 B1* | 7/2015 | Hyde | G06Q 10/0631 |
| 9,384,515 B2 | 7/2016 | Schondorf et al. | |
| 2009/0027056 A1* | 1/2009 | Huang | B60L 11/1857 324/439 |
| 2010/0211340 A1 | 8/2010 | Lowenthal et al. | |
| 2011/0246252 A1* | 10/2011 | Uesugi | B60L 3/12 705/7.12 |
| 2011/0313603 A1* | 12/2011 | Laberteaux | B60L 11/184 701/22 |
| 2012/0086395 A1* | 4/2012 | Kim | B60L 11/1838 320/109 |
| 2012/0133337 A1* | 5/2012 | Rombouts | H02J 3/32 320/155 |
| 2012/0271547 A1* | 10/2012 | Mori | B60L 11/184 701/527 |
| 2012/0280653 A1 | 11/2012 | Prosser et al. | |
| 2012/0330494 A1* | 12/2012 | Hendrix | B60L 11/1838 701/29.3 |
| 2013/0091083 A1* | 4/2013 | Frisch | G06N 99/005 706/14 |
| 2014/0028254 A1* | 1/2014 | Shane | H02J 3/14 320/109 |
| 2014/0217976 A1* | 8/2014 | McGrath | B60L 11/1837 320/109 |
| 2014/0340038 A1* | 11/2014 | Toggenburger | B60L 11/1824 320/109 |
| 2016/0039295 A1* | 2/2016 | Madurai-Kumar | B60L 11/184 320/109 |
| 2016/0047862 A1* | 2/2016 | Shimizu | H02J 3/00 702/63 |
| 2016/0075247 A1* | 3/2016 | Uyeki | B60L 11/1842 455/456.3 |
| 2017/0267116 A1* | 9/2017 | Lindemann | B60L 11/1809 |
| 2018/0001783 A1* | 1/2018 | Schwichtenhoevel | B60L 11/1862 |

* cited by examiner

ADAPTIVE SYSTEM AND METHOD FOR OPTIMIZING A FLEET OF PLUG-IN VEHICLES

TECHNICAL FIELD

The present disclosure relates to an adaptive system and method for optimizing a fleet of plug-in electric vehicles.

BACKGROUND

High-voltage batteries may be used to energize electric machines in a variety of different systems. For instance, output torque from an electric machine may be used to power an input member of a transmission in a plug-in vehicle, i.e., a vehicle having a battery pack that may be recharged via a charging outlet or other off board power supply. The individual cells of a battery pack gradually age and degrade over time. As a result, battery performance parameters such as open circuit voltage, cell resistance, and state of charge may change relative to calibrated/new values. Battery degradation is therefore typically monitored by a designated controller in order to estimate the amount of electrical energy remaining in the battery pack. Electric vehicle range estimates can be generated from the estimated electrical energy and thereafter used for effective route planning, and/or to execute automatic powertrain control actions.

Several factors can contribute to battery degradation and shorten battery life. For instance, battery packs that are maintained at a high state of charge level tend to degrade much faster than battery packs maintained within a lower, more optimal state of charge range. Higher battery charging currents and temperatures can also shorten battery life. Battery packs of the types typically used in plug-in vehicles are trending toward larger sizes suitable for longer all-electric driving distances, in some cases well over 200 miles on full charge. However, range anxiety and other factors such as time constraints, personal driving habits, and a limited appreciation for battery physics may lead to preferred battery charging habits that can shorten battery life. For instance, if a given fleet vehicle's normal daily electric driving range is 30-50 miles in a vehicle having a fully-charged electric operating range of 200 miles, the act of fully charging the battery pack at every charging event will result in maintenance of a high state of charge throughout the duration of ownership of the vehicle. This in turn may reduce battery life.

SUMMARY

A system and an adaptive method are disclosed herein that together allow a coordinator of a fleet of electric vehicles for use by consumers and extend the life of vehicle battery packs in the fleet. Over time, a controller having an adaptive algorithm monitors and learns the region's driving habits for a vehicle fleet, energy use, and battery charging behavior by retrieving data from each vehicle in a fleet. Charging of each battery pack then is automatically controlled in response to various data inputs and in accordance to an optimizing algorithm at the location control module in the controller. Life of each battery pack in the fleet is thereby extended and optimized for the vehicle's use by selectively charging the battery pack to a state of charge (SOC) level that more closely matches an optimal SOC level needed for optimizing battery life, and by selectively controlling the charging operation. Moreover, each vehicle in the fleet is designated under the system and method of the present disclosure for specific travel at a specific location based on the SOC and the adaptive algorithm in order to ensure efficient use of vehicles in a fleet by consumers.

A system and adaptive method of the present disclosure enables an owner or coordinator of a vehicle fleet to maximize profits from the vehicle fleet. The system and adaptive method enables an owner to plan and charge fleet vehicles in advance in anticipation for a fleet vehicle need. The system and adaptive method of the present disclosure also enables an owner or coordinator of vehicle fleet to lengthen the battery life for each vehicle by preventing needless "high-level" charging of a vehicle battery, and by rotating the use of the fleet vehicles in order to allow for even distribution of fleet vehicle use.

In particular, an example system is disclosed herein for use in a plug-in vehicle. The system includes sensors, a global positioning system (GPS) receiver, a user interface, and a controller. The sensors are collectively operable for locating the plug-in fleet vehicle, measuring battery performance data of a battery pack of the vehicle, with the battery performance data including an open-circuit voltage, SOC level, charging current, and/or a temperature of the battery pack. The GPS receiver is operable for determining a position of the vehicle, which is then tracked over time to allow the controller to build and record a driving history for a given coordinator fleet vehicle 10. The controller, which is in communication with the fleet vehicle and the GPS receiver, is programmed to monitor degradation of the battery pack over time using the measured battery performance data.

The controller is further programmed to determine the driving history for a region and for each vehicle as well as the battery charging history for each vehicle using the measured battery performance data as well as a position signal from the GPS receiver, with the driving history and battery charging history identifying the days, hours, and locations during/at which each vehicle is driven and charged. Using the information received by the controller from the sensors, the controller applies a model or via an adaptive learning module to the data which then automatically controls a charging operation of each fleet vehicle battery pack by sending out a charging control signal to each vehicle based on the unique data from that fleet vehicle, and also records the measured battery performance data for the identified data bin A method is also disclosed herein for optimizing life of a battery pack in a plug-in vehicle fleet by rotating vehicles within a fleet. In a particular embodiment, the method includes measuring battery performance data of each battery pack in the fleet via a plurality of sensors disposed at each vehicle in the fleet, including measuring an open-circuit voltage of each battery pack in the fleet, and also determining a position for each vehicle in the fleet using a GPS receiver. The method also includes monitoring degradation of the battery pack over time via a controller using the measured battery performance data, as well as determining driving history, and present/future fleet vehicle needs as well as battery charging history for each vehicle using the measured battery performance data, real-time data, and a position signal from the GPS receiver.

The above noted and other features and advantages of the present disclosure are readily apparent from the following detailed description of the best modes for carrying out the disclosure when taken in connection with the accompanying drawings.

DETAILED DESCRIPTION

Figure 1:
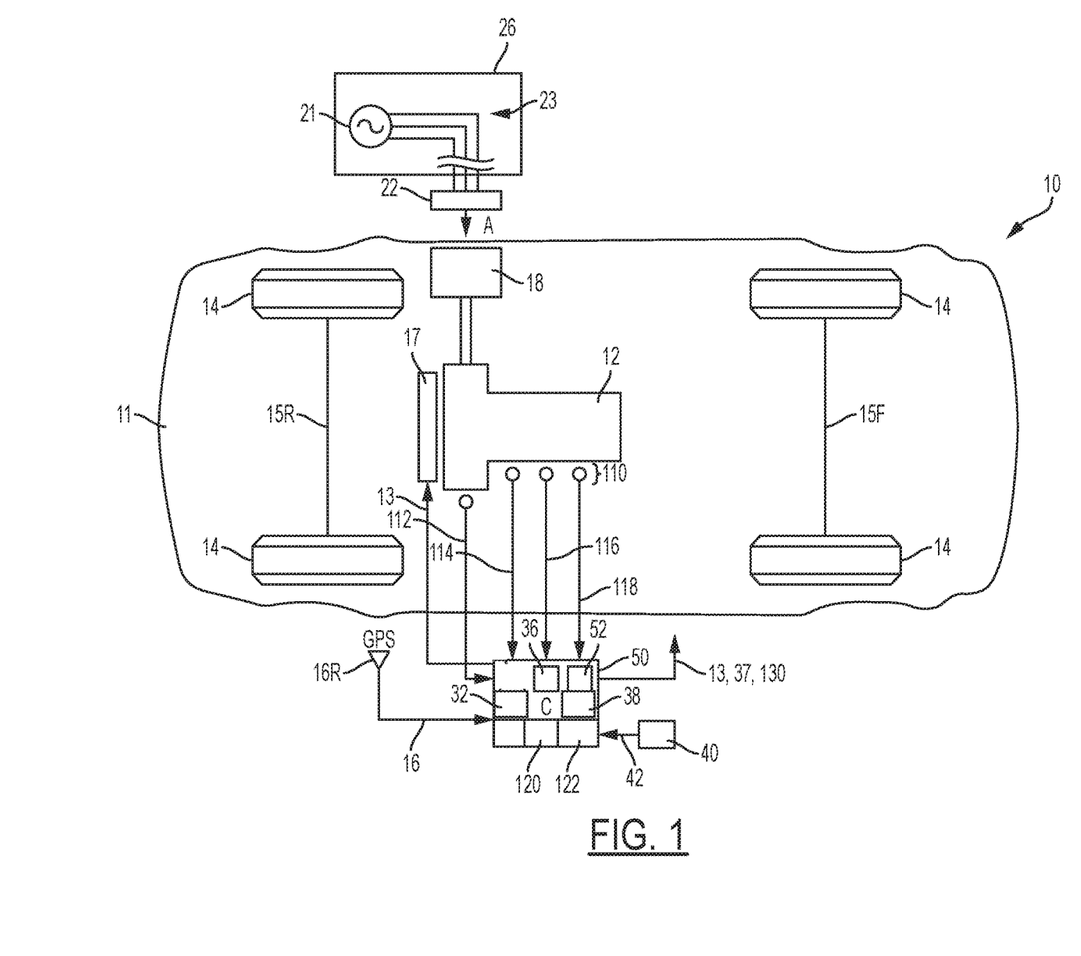
FIG. 1 is a schematic illustration of an example plug-in vehicle having a rechargeable battery pack and a system for optimizing life of the battery pack.

Referring to the drawings, wherein like reference numerals are used to identify like or identical components in the various views, FIG. 1 schematically illustrates an example plug-in fleet vehicle 10 having a chassis 11, a rechargeable battery pack 12, and a controller 50. The fleet vehicle 10 also includes a global positioning system (GPS) receiver 16R operable for receiving position data from a set of GPS satellites (not shown), and for providing the controller 50 with a corresponding GPS signal 16 describing the geographic coordinates of the fleet vehicle 10 on a geocoded map, as is well known in the art.

The controller 50 is programmed to record the driving/charging history of for each fleet vehicle 10 as well as the fleet vehicle's 10 state of charge, and to use such information from each fleet vehicle in order for the controller to determine the appropriate charging level and to determine the location designation. Additionally, the controller 50 is programmed to automatically control a charging operation of each battery pack 12 as set forth below with reference to FIGS. 2 and 3 in a manner that helps extend the useful life of the battery pack 12.

The fleet vehicle 10 of FIG. 1 may include an electric powertrain (not shown) in which one or more electric machines draw electrical power from the battery pack 12 and deliver motor torque to drive wheels 14 via one or more front and/or rear drive axles 15F and/or 15R. The controller 50 via an adaptive learning module (ALM) 38 automatically executes instructions embodying a method 100 to thereby extend and optimize the life of the battery pack 12 in each fleet vehicle 10, informed in part using information contained in the GPS position signal (arrow 16) from the GPS receiver 16R as well as SOC data from the fleet vehicle 10.

The fleet vehicle 10 may be embodied as any mobile platform whose battery pack 12 can be selectively recharged by connection to an off-board power supply 21 such as a 120VAC or 240VAC wall outlet or electric charging station 26 (shown in FIG. 1). The fleet vehicle 10 may include an onboard charging module (OBCM) 18 of the type known the art. The OBCM 18 can be selectively connected to the power supply 21 via an electrical connector 22 and suitable electrical cables 23, as indicated by arrow A at a charging station 26. The OBCM 18 converts AC power from the power supply 21 into DC power suitable for increasing an SOC level of the battery pack 12. In various embodiments, the fleet vehicle 10 may be an extended-range electric vehicle or a battery electric vehicle, with the latter typically having an electric vehicle operating range of 40-200 miles or more on a fully charged battery pack 12 when such a battery pack 12 is new.

As part of the method 100, each fleet vehicle 10 may be equipped with a plurality of battery sensors 110 each operable for measuring and/or otherwise determining a corresponding performance parameter of the battery pack 12. For instance, battery sensors 112 may be used to directly measure or help determine a state of charge and may include a temperature sensor 114 operable for measuring a battery temperature, a voltage sensor 116 operable for measuring the battery voltage and/or a current sensor 118 for determining a battery current of individual battery cells or groups of battery cells (not shown) of the battery pack 12, with such values transmitted or otherwise reported to the controller 50.

As is known in the art, the SOC of a battery such as the battery pack 12 may be determined by different methods, such as the use of an equivalent circuit to model the battery pack 12 and account for surface charge on the various conductive plates (not shown) of the battery pack 12.

Use of vehicle fleet management method 100 is intended to ensure optimal range and life of each of the battery packs 12 in the fleet and to optimize the locations for stationing the various plug-in vehicles by automatically adapting charging operations and driving distances according to data processed by a location allocation module in the system controller. As such, the controller 50 may record a corresponding driving history and charging history for each vehicle 10 in the fleet. Specifically, the method 100 takes into account the need to collect battery information at lower or higher SOC levels of the battery pack 12 in order to better estimate the true electrical capacity and remaining electrical range of the battery pack 12 as well as to determine how to use each vehicle in the fleet as later described. Use of the method 100 results in automatic adjustment of a normally-used SOC range via output signals 13 communicated to the OBCM 18 of each fleet vehicle when the battery pack 12 is plugged in and is actively charging.

A coordinator of the fleet and the associated fleet vehicle 10 may be provided with an option to disable execution of the method 100, and thus control the charging operation in a particular manner, via receipt of an override signal 42 from a user interface 40, e.g., a cell phone, tablet, or touch screen. A system user can then control the charging operation by charging the battery pack 12 to a SOC after transmitting an override signal 42, such as by allowing charging of the battery pack 12 to a full SOC, thus providing the full energy capacity of the battery pack 12 in a fleet vehicle.

The controller 50 of FIG. 1 may be embodied as one or more distinct devices, each possibly having one or more microcontrollers or central processing units 122 and memory 120 e.g., read only memory, random access memory, and electrically-erasable programmable read only memory. The controller 50 and interactive user interface 40 may include a calendar 52, recorded charging control targets 36 as explained below, a high-speed clock, input/output circuitry, and/or any other circuitry that may be required to perform the functions described herein. In different configurations, the user interface 40 and the controller 50 may be the same device or separate devices.

The user interface 40 and the controller 50 may be digitally interconnected with the memory 120, and may be configured to retrieve and execute such software applications in a manner that is known in the art. Likewise, the user interface 40 may include a liquid crystal display, a light emitting diode display, an organic light emitting diode display, and/or any similar style display/monitor that may exist or that may be hereafter developed. In different embodiments, the user interface 40 may be a touch-sensitive screen of a navigation or infotainment system located in a center stack (not shown) of the fleet vehicle 10, and/or of a cell phone or other portable electronic device. A capacitive or touch-based digitizer may be integrated within the user interface 40 and operable to detect contact from a coordinator as the override signal 42 and automatically convert the digitized contact into a suitable input signal usable by the controller 50.

Also, the method 100 is intended to enable SOC data to be collected from each fleet vehicle 10. Needlessly maintaining SOC at a high level can degrade the battery pack 12 over time, as noted above. Therefore, method 100 is intended to prevent such unnecessary degradation while still optimizing performance of the overall vehicle fleet and each fleet vehicle 10.

Figure 2:
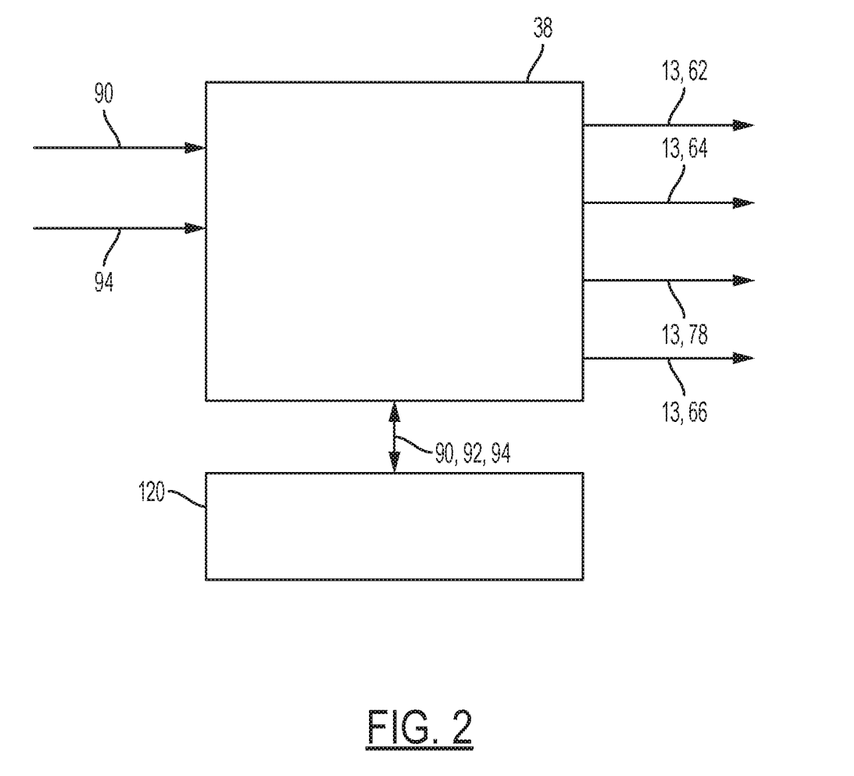
FIG. 2 is a schematic logic flow diagram for the adaptive learning module of the remote controller shown in FIG. 1.

Referring to FIG. 2, which depicts logic flow through the Adaptive Learning Module 38 of FIG. 1, the controller 50 of FIG. 1 may be programmed with an adaptive learning module (ALM) 38 that optimizes charging of each battery pack 12 in a fleet among other things by designating the lowest possible charge to a fleet vehicle depending on the usage of the particular vehicle and rotating the fleet vehicle according to usage. State of charge data for the battery pack 12 of fleet vehicle 10 accordingly is collected along with other data to estimate a remaining electric vehicle operating range of the fleet vehicle 10.

The state of charge data 90 for the battery pack is shown in FIG. 2 as a data input to the adaptive learning module. Regional needs data 92 is also shown as a data input to the ALM 38. Regional needs data 92 may be provided by system customers as they input their reservations. Regional needs data 92 may be stored in memory module 120 of controller 50 until such data is needed for a particular fleet vehicle 10. Another input for the adaptive learning module 38 is vehicle driving history data 94, the vehicle driving history data 94 along with state of charge data 90 is gathered from a fleet vehicle 10 when it is hooked up to a charging station 26.

The controller 50 may also determine the control targets for the SOC or state of energy (SOE), as well as the time required ($t_R$) and time available ($t_A$) for achieving such targets. An example control target 36 for the SOC may be charge at 50%-50% of the battery's capacity. The time available ($t_A$) may be determined by the controller 50 using the past driving history of the fleet vehicle such charge used for a certain drive distance. Accordingly, the adaptive learning module 38 may be programmed with a calibrated optimal state of charge ($SOC_{OPT}$) for the battery pack 12, e.g., 50-60% SOC, which the controller 50 may attempt to maintain.

The controller 50 then determines the particular charging strategy to be implemented in a particular fleet vehicle 10 when such vehicle is hooked to a charging station 26. The method 100 of FIG. 3 of the adaptive learning module 38 may be used to implement a charging strategy. Specifically, among other things, the controller 50 may determine when to initiate charging of the battery pack 12, when to interrupt or discontinue such charging, the level of charging current to use, when to complete charging, and the state of charge level to use as a threshold for determining when charging is complete. It is understood that a fleet vehicle will typically be routed to a charging station after each route with a customer so that the fleet vehicle may communicate with the controller 50 and also be recharged according to the algorithm/method 100 of the ALM 38 if necessary. The various actions taken by the adaptive learning module 38 are explained in further detail below with reference to the method 100 depicted in FIG. 3.

The controller 50 may output a charging status signal 130 (shown in FIG. 1) to a vehicle interface (not shown) or to a controller interface 40 which indicates whether charging operations are pending, active, or complete, and a charging current level for a particular fleet vehicle 10. Monitoring of normal charging behavior by the controller 50 tracks locations and the number of charging events normally completed each day of the week, via the calendar 52, in an effort to further optimize life of the battery pack 12.

Figure 3:
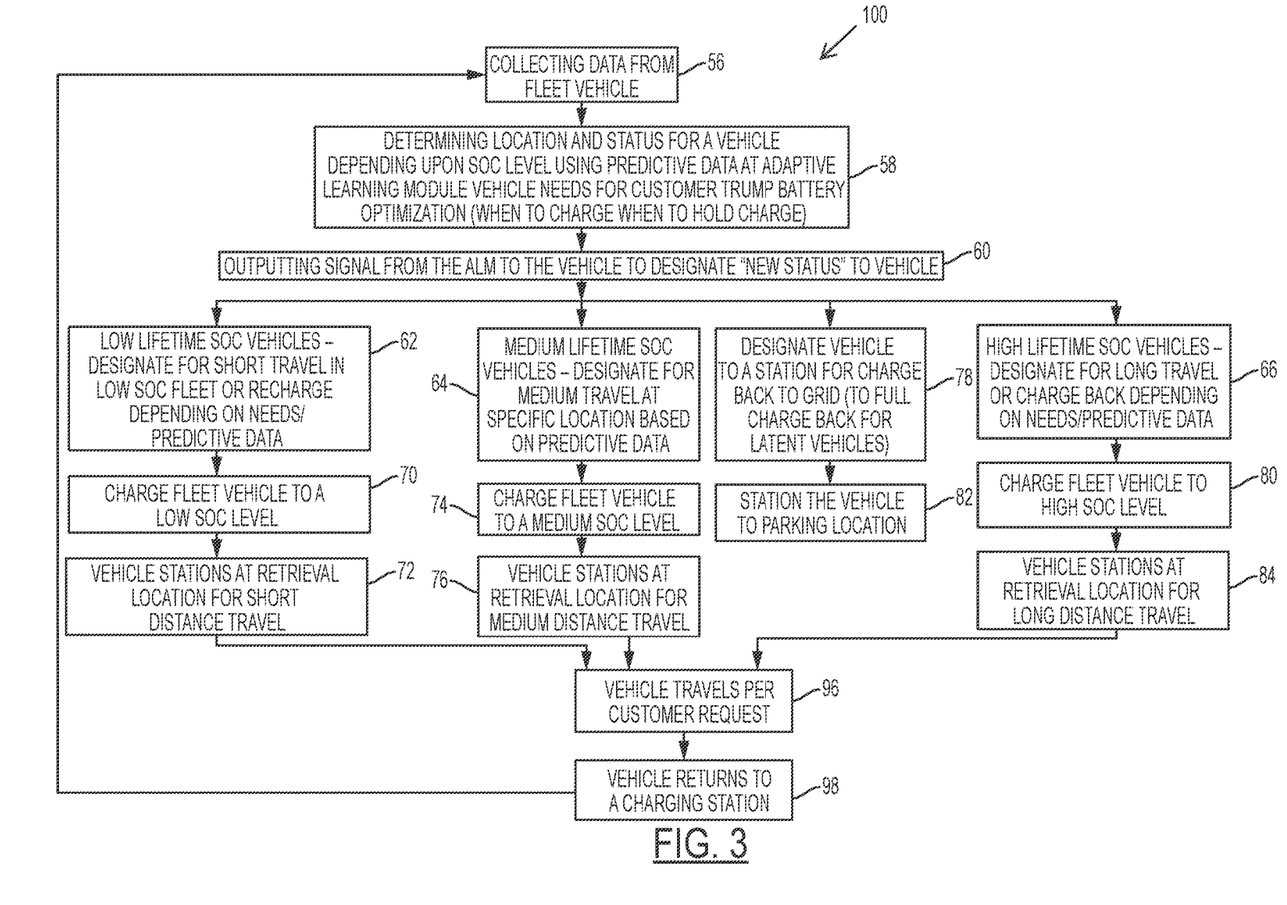
FIG. 3 is a flow chart which shows an example adaptive method for optimizing a fleet of electric vehicles such as the example vehicle shown in FIG. 1.

Referring to FIG. 3, an embodiment of the method 100 is depicted for an example charging scenario of the battery pack 12 shown in FIG. 1. The method 100 relies on the controller 50 gathering driving history data 94 and a battery history data (including state of charge data) 90 for a fleet vehicle 10 using the measured battery data and the position signal 16 from the GPS receiver 16R of FIG. 1. The driving history data 94 and battery history data (including state of charge data) 90 identify the days, hours, and locations at which the fleet vehicle 10 was driven and/or charged the battery pack 12. In a particular region, it is understood that fleet vehicles 10 may tend to be used in a certain way on a given day, such as commuting to/from work on weekdays and traveling in a different manner on weekends, and will also tend to repeat those patterns from week to week. The calendar module 52 can be used to track actual behavior over time and control the charging operation based on such histories. This information is tracked and retained by controller 50 for each fleet vehicle 10, and such information is retained in memory module 120.

Based on the aforementioned data, the ALM 38 of the controller 50 determines an appropriate designation for the fleet vehicle (high SOC/medium SOC/low SOC/chargeback) and then may automatically control a charging operation of the battery pack 12 via the output signal 13 of FIG. 1 until an actual SOC of the battery pack 12 is at or near a target SOC appropriate for the designation of the fleet vehicle 10—high SOC vehicle getting a high output signal 62 (shown in FIG. 3); medium SOC vehicle getting a medium output signal 64 (shown in FIG. 3); low SOC vehicle getting a low output signal 66 (shown in FIG. 3); chargeback SOC vehicle getting a chargeback output signal 78 (shown in FIG. 3).

Therefore, in the non-limiting example shown in FIG. 3, method 100 may implement a multi-step process performed by controller 50 which is in communication with each plug-in vehicle in the fleet. The method 100 implements a first step which involves gathering data which typically occurs while a fleet vehicle 10 is plugged in for charging at a station. The fleet vehicle 10 may be routed to a charging station 26 after every route traveled. As indicated, the data gathered may include but is not limited to the SOC or battery data 90 for the fleet vehicle 10 (upon engagement of the fleet vehicle with the charging station 26) which includes historical charging information for that particular fleet vehicle. Other data, such as driving history data 94, may be gathered which includes location and travel data (positioning data) of the particular fleet vehicle 10 via the GPS.

Within the memory module 120 of controller 50, various data may be stored regarding the pattern and use of the fleet vehicles. Such data may include driving history data 94, reservation data (regional needs data 92) and battery data 90 as such data comes in from fleet vehicle sensors, customers and/or regional data entry for upcoming large public events. An example large public event may be the Super Bowl or a concert which may be entered into the controller so that the model/method/algorithm 100 could adjust for a spike in fleet vehicle use. Therefore, the adaptive learning module (ALM) 38 includes a model which can predict the likely use of a fleet vehicle and its route based on the aforementioned data.

The aforementioned regional needs data entry 92 may include an estimated number additional fleet users and likely drive patterns associated with the public event data. One non-limiting example drive pattern may be a route from one of many hotels in the area to the large public event such as a football stadium. The number of potential routes from each hotel to the event location may be based on whether the event is sold out, the capacity of the event as well as the capacity of each particular hotel. Therefore, more potential future routes may be designated for the largest hotel in the region when compared to the smallest hotel in the region.

The model/algorithm 100 of the Adaptive Learning Module 38 then compares the received driving history data 94 and current battery data 90 for a particular fleet vehicle 10 at a charging station 26 against the regional needs data 92—reservation data and historical data. The model/algorithm 100 identifies a potential present need for one of a low SOC vehicle/medium SOC vehicle/high SOC vehicle/chargeback vehicle, and may assign that fleet vehicle 10 to fill that future need by sending 60 an output signal 13 to the particular fleet vehicle. As shown in FIG. 1, output signal 13 may be sent to the engine control module 17, charging station 26 (remotely) and/or battery pack 12 to provide designation information for the particular fleet vehicle—new location designation. The output signal 13 may also identify level of charge to which the fleet vehicle must be charged to (or charged back to) as later described herein. The output signal 13 from the controller 50 may generally fall into one of four categories (1) a low output signal 62; (2) a medium output signal 64; (3) a high output signal 66; (4) a recharge signal 78.

In the event that the fleet vehicle 10 at the charging station 26 receives a low output signal 62, the ALM module 38 determines that the particular fleet vehicle 10 should be designated to address a low SOC need and accordingly, transmits 60 a low output signal 62 to the particular fleet vehicle 10. For the purposes of the present disclosure, a fleet vehicle 10 that receives a low SOC signal 62 shall be referred to as a "low SOC vehicle" where the fleet vehicle 10 is designated for use in short travel.

In accordance to one embodiment, it is understood that the low output signal 62 designates the fleet vehicle 10 for short travel so that the fleet vehicle 10 is charged 70 to a low level and then stationed 72 at a frequent and open "ride retrieval location" where passengers tend to take such vehicles for short distance travel. Moreover, a low SOC vehicle will only be recharged to a "lower level" (about 10%-34%) thereby preventing a full charge which could unnecessarily degrade the lifespan of the battery. When a particular vehicle has been used as a low SOC vehicle for a predetermined amount of time, the method 100 may then send 60 an output signal 13 in the form of a medium output signal 64 so that the low SOC vehicle may be recharged 74 to either a medium SOC level (via a medium output signal 64) or recharged 80 to a high SOC level (via a high output signal 66) so that the vehicle may be rotated into that corresponding portion of the fleet—by charging the fleet vehicle to the newly designated level and the new location. The benefit of rotating vehicles into a limited higher SOC status is that the system minimizes the amount of full charge applied to any one of the fleet vehicle batteries. Accordingly, the battery life for the overall fleet is increased.

Where the ALM 38 determines that there is a need to provide a vehicle for medium distance travel, the ALM may send 60 a medium charge signal 64 to a particular vehicle at a charging station. Medium travel distances fall within a predetermined range which is greater than the short distance travel predetermined range and long distance travel predetermined range. Therefore, the method 100 may designate 64 a fleet vehicle 10 for a medium travel distance by transmitting an output signal 13 to the fleet vehicle 10 such that the fleet vehicle stations 76 itself at a frequent and open ride retrieval location for medium distance travel after the fleet vehicle 10 has been charged to a medium state of charge (approximately 35%-65%). It is understood that these percent ranges and categories for low/medium/high are provided as non-limiting examples, and therefore, other similar categories/percent ranges may be implemented in accordance with the present disclosure.

When a particular vehicle has been used as a medium SOC vehicle for a predetermined amount of time with a customer 96, the fleet vehicle 10 is routed 98 back to a charging station 26 where the fleet vehicle 10 communicates with controller 50. At this point, the method 100 may then rotate the fleet vehicle 10 to another segment (low/high) of the fleet by sending an output signal 13 to that particular fleet vehicle 10 where the fleet vehicle 10 is directed to go to a charging station 26 so that the vehicle may be recharged to a higher or lower SOC level depending on whether the fleet vehicle received a high charge signal 66 or a low charge signal 62. By changing the type of output signal 13, a fleet vehicle 10 may be rotated into different SOC levels of a fleet Referring back to FIGS. 1 and 3, when the ALM 38 determines 58 that there is a need to provide a fleet vehicle for long travel distances, the ALM 38 may provide 60 a new designation to the fleet vehicle 10 once the fleet vehicle is at a charging station 26. When the fleet vehicle 10 is designated for long distance travel, the fleet vehicle 10 may send 60 out a high output signal 66 to the fleet vehicle. Long travel distances fall within a predetermined range which is greater than the medium travel distance predetermined range. Therefore, upon receiving a high output signal 66, the fleet vehicle 10 is designated as a "high SOC vehicle" such that the fleet vehicle is charged to a maximum or high SOC 80, such as but not limited to a charge range of about 66% to 100%. After receiving a full or high recharge, the fleet vehicle may be directed (via the output signal 66) to station 86 itself at a frequent and available/open ride retrieval location where passengers take such vehicles for long distance travel.

As stated earlier, the ALM 38 determines an appropriate designation for a fleet vehicle at a charging station (shown as 58 in FIG. 3) on the various data inputs into the model. Therefore, in this example, when a particular vehicle has been used as a high SOC vehicle for a predetermined amount of time, the method may then rotate the vehicle and send an output signal 13 such that the particular fleet may be recharged back to a lower SOC level (where the output signal is a low output signal 62) for short travel, or a negligible SOC level (where the output signal 13 is a charge back signal 78) so that the vehicle may "rest." By giving a vehicle battery an opportunity to operate at a SOC level that is lower, the vehicle battery lifespan may be lengthened compared to a vehicle battery which is always being fully recharged.

Therefore, referring again to FIGS. 1 and 3, after completing a route with a customer (shown as 96 in FIG. 3), the controller 50 and the ALM 38 may, but not necessarily send 60 an output signal 13 which is a charge back signal 78 to the fleet vehicle 10 such that the vehicle 10 may charge back 82 to the grid completely or near completely such that the fleet vehicle 10 is designated for non-use for a period of time. When a vehicle charges back completely, the fleet vehicle 10 may be parked at a pre-determined location such as a parking lot for a predetermined period of time.

By adaptively controlling charging operations in a manner that is informed by demonstrated customer request data, energy usage, drive distances, and battery conditioning tasks as explained above, the method 100 may help improve the life of each battery pack 12 in each vehicle in the fleet by keeping the overall battery charge low for each fleet vehicle while optimizing the use of each plug-in vehicle in the fleet according customer needs and charges available in each vehicle. At the same time, the user interface 40 provides a coordinator with the option of quickly overriding such automatic charging control actions, whether from within the fleet vehicle 10 or via a mobile device. At the same time, by ensuring SOC battery data from each fleet vehicle is received each time a fleet vehicle 10 is recharged, the system coordinator may further benefit from a quantifiable state of health of each battery pack 12, e.g., by increasing resale value of the fleet vehicle 10. That is, faced with two otherwise identical vehicles 10, a potentially buyer of one of the vehicles 10 may opt for the fleet vehicle 10 having the battery pack 12 having the longest remaining useful life or highest state of health.

While the best modes for carrying out the disclosure have been described in detail, those familiar with the art to which this disclosure relates will recognize various alternative designs and embodiments lying within the scope of the appended claims. It is intended that all matter contained in the above description and/or shown in the accompanying drawings shall be interpreted as illustrative only and not as limiting.

What is claimed is:

1. A system for optimizing life of a plurality of battery packs in a fleet vehicle, the system comprising:
    a battery sensor on a fleet vehicle operatively configured to measure performance data of a vehicle battery in the fleet vehicle;
    a global positioning system (GPS) receiver operable for determining a position of the fleet vehicle;
    a controller in communication with the battery sensor and the GPS receiver, wherein the controller is further programmed to:
        determine a battery charging history and a driving history for the fleet vehicle using the measured battery performance data and a position signal from the GPS receiver, wherein the driving history and the battery charging history identify the days, hours, and locations at which the vehicle was driven;
        obtain a state-of-charge for the vehicle battery;
        determine a system need for the fleet vehicle via an adaptive learning module;
        transmit an output signal to at least one of the fleet vehicle and a charging station associated with the fleet vehicle, the output signal being one of a high output signal, a medium output signal, a low output signal, or a chargeback output signal;
        automatically control a charging operation of the vehicle battery in the fleet vehicle based on the output signal; and
        direct the fleet vehicle to a new location based on the output signal.

2. The system of claim 1 wherein the new location for the fleet vehicle is a parking lot when the output signal is the chargeback signal.

3. The system of claim 1 wherein the new location for the fleet vehicle is an open ride retrieval location for long travel distances when the output signal is the high output signal.

4. The system of claim 1 wherein the new location for the fleet vehicle is an open ride retrieval location for short travel distances when the output signal is the low output signal.

5. The system of claim 1 wherein the new location for the fleet vehicle is an open ride retrieval location for medium travel distances when the output signal is the medium output signal.

6. A method for optimizing life of a plurality of battery packs in a plug-in vehicle fleet, the method comprising:
    measuring battery performance data battery pack of a fleet vehicle via a plurality of sensors in the fleet vehicle, including measuring an open-circuit voltage of the battery pack;
    determining a position of the fleet vehicle using a global positioning system (GPS) receiver;
    monitoring the degradation of the battery pack of the fleet vehicle over time via a controller using the measured battery performance data;
    determining a driving history and a battery charging history for the fleet vehicle using the measured battery performance data and a position signal from the GPS receiver, wherein the driving history and battery charging history identify the days, hours, and locations for the fleet vehicle;
    determining a system need for the fleet vehicle based on a regional data input, the driving history and the battery charging history for the fleet vehicle via an adaptive learning module;
    transmitting an output signal responsive to the system need;
    automatically controlling a charging operation of a battery pack for the plug in the vehicle via the controller based on the output signal; and
    stationing the fleet vehicle to a new location based on the output signal.

7. The method of claim 6, wherein the plurality of sensors includes a current sensor operable for detecting the charging current and a temperature sensor operable for measuring a temperature of the battery pack, and wherein measuring the battery performance data includes measuring the charging current and the temperature.

8. The method of claim 6, wherein the step of stationing the fleet vehicle to a new location includes directing the fleet vehicle to a parking lot when the output signal to the fleet vehicle is a chargeback signal.

9. The method of claim 6, wherein the step of stationing the fleet vehicle to a new location includes directing the fleet vehicle to an open ride retrieval location for long travel distances when the output signal to the fleet vehicle is a high output signal.

10. The method of claim 6, wherein the step of stationing the fleet vehicle to a new location includes directing the fleet vehicle to an open ride retrieval location for short travel distances when the output signal to the fleet vehicle is a low output signal.

11. The method of claim 6, wherein the step of stationing the fleet vehicle to a new location includes directing the fleet vehicle to an open ride retrieval location for medium travel distances when the output signal to the fleet vehicle is a medium output signal.

12. The method of claim 6, wherein the step of automatically controlling a charging operation of the battery pack includes adjusting the SOC for the battery pack to a high SOC when the output signal is a high output signal.

13. The method of claim 6, wherein the step of automatically controlling a charging operation of the battery pack includes adjusting the SOC for the battery pack to a low SOC when the output signal is a low output signal.

14. The method of claim 6, wherein the step of automatically controlling a charging operation of the battery pack includes adjusting the SOC for the battery pack to a medium SOC when the output signal is a medium output signal.

* * * * *